US012341890B2

(12) United States Patent
Major et al.

(10) Patent No.: US 12,341,890 B2
(45) Date of Patent: *Jun. 24, 2025

(54) TOKEN-BASED ZERO-TOUCH ENROLLMENT FOR PROVISIONING EDGE COMPUTING APPLICATIONS

(71) Applicant: Nvidia Corporation, Santa Clara, CA (US)

(72) Inventors: Daniel Major, Ottawa (CA); Mark Overby, Snohomish, WA (US)

(73) Assignee: Nvidia Corporation, Santa Clara, CA (US)

( * ) Notice: Subject to any disclaimer, the term of this patent is extended or adjusted under 35 U.S.C. 154(b) by 389 days.

This patent is subject to a terminal disclaimer.

(21) Appl. No.: 18/056,068

(22) Filed: Nov. 16, 2022

(65) Prior Publication Data

US 2023/0076915 A1     Mar. 9, 2023

Related U.S. Application Data

(63) Continuation of application No. 17/062,348, filed on Oct. 2, 2020, now Pat. No. 11,563,579.

(51) Int. Cl.
*H04L 29/06* (2006.01)
*G06F 7/58* (2006.01)
*H04L 9/32* (2006.01)

(52) U.S. Cl.
CPC . *H04L 9/32* (2013.01); *G06F 7/58* (2013.01)

(58) Field of Classification Search
CPC ......... H04L 9/32; H04L 9/088; H04L 9/3213; H04L 9/3247; H04L 9/3271;
(Continued)

(56) References Cited

U.S. PATENT DOCUMENTS 9,154,480 B1 * 10/2015 Juels ............... H04L 9/3271
10,057,243 B1    8/2018 Kumar
(Continued)

FOREIGN PATENT DOCUMENTS

CA     3037379 A1 *  4/2018  .......... G06F 21/305
CN     106134154 A   11/2016
(Continued)

OTHER PUBLICATIONS

Notice of Allowance dated Oct. 3, 2022, issued in U.S. Appl. No. 17/062,348.

*Primary Examiner* — Sher A Khan
(74) *Attorney, Agent, or Firm* — Hogan Lovells US LLP

(57) ABSTRACT

Approaches in accordance with various embodiments allow for zero-touch enrollment of devices with respective manager systems. In at least one embodiment, a device at startup can contact a central directory service (CDS) for information about an associated manager. The CDS can authenticate the device using device information included in the request, and can send a challenge token to the device in response. The challenge token can include information for the manager, protected with multiple layers of security that should only be able to be decrypted by the authenticated device. The device can decrypt this challenge token to determine the manager information, and can convert this challenge token to a bearer token. The device can then send a request to the determined manager that includes the bearer token, which the manager can use to authenticate the device. The manager can then send the device appropriate configuration information.

17 Claims, 11 Drawing Sheets

(58) Field of Classification Search
CPC ............ H04L 63/0807; H04L 63/0853; H04L 9/0861; G06F 7/58
See application file for complete search history.

(56) References Cited

U.S. PATENT DOCUMENTS

| | | | |
|---|---|---|---|
| 10,270,770 B1* | 4/2019 | Irwan | H04L 63/0876 |
| 10,382,203 B1* | 8/2019 | Loladia | H04L 63/06 |
| 11,080,387 B1 | 8/2021 | Lattin | |
| 2014/0149741 A1 | 5/2014 | Balakrishnan et al. | |
| 2015/0318993 A1 | 11/2015 | Hamlin | |
| 2016/0323689 A1* | 11/2016 | Goluboff | H04L 63/0823 |
| 2018/0198604 A1 | 7/2018 | Hayton | |
| 2018/0316673 A1* | 11/2018 | Shah | H04W 12/06 |
| 2019/0036906 A1* | 1/2019 | Biyani | H04L 63/102 |
| 2019/0057204 A1* | 2/2019 | Marcovecchio | H04L 67/146 |
| 2019/0058586 A1* | 2/2019 | Kumar | H04W 12/06 |
| 2019/0149538 A1* | 5/2019 | Friel | H04W 12/069 726/6 |
| 2019/0230063 A1* | 7/2019 | McCready | H04L 63/08 |
| 2019/0303587 A1* | 10/2019 | Hamel | H04L 9/3257 |
| 2019/0342280 A1 | 11/2019 | Shaw et al. | |
| 2019/0373472 A1* | 12/2019 | Smith | G06F 21/645 |
| 2020/0177589 A1* | 6/2020 | Mangalvedkar | H04W 4/50 |
| 2020/0186365 A1* | 6/2020 | Kumar | H04L 9/3263 |
| 2020/0204538 A1* | 6/2020 | Friel | H04L 63/0876 |
| 2020/0396578 A1* | 12/2020 | Hall | H04W 12/08 |
| 2021/0021418 A1 | 1/2021 | Makhalov | |
| 2021/0120088 A1* | 4/2021 | Barton | H04L 41/0886 |
| 2021/0120412 A1* | 4/2021 | Bruner | H04W 4/50 |
| 2021/0152341 A1* | 5/2021 | Park | G06F 21/71 |
| 2021/0306157 A1* | 9/2021 | Wattiau | H04L 9/3265 |
| 2021/0352110 A1* | 11/2021 | Huffman | H04L 63/02 |
| 2021/0352472 A1* | 11/2021 | Ganesan | H04L 63/0272 |

FOREIGN PATENT DOCUMENTS

| | | | |
|---|---|---|---|
| CN | 106161100 A * | 11/2016 | G06F 8/65 |
| CN | 106575326 | 4/2017 | |
| CN | 107147496 A | 9/2017 | |
| CN | 108810029 A | 11/2018 | |
| CN | 109194484 A | 1/2019 | |
| CN | 110677252 A | 1/2020 | |
| DE | 102020109696 A1 * | 10/2021 | G05B 19/0425 |
| EP | 3602991 A1 | 2/2020 | |
| EP | 3764613 | 1/2021 | |
| WO | 2006113834 A2 | 10/2006 | |
| WO | WO-2016159954 A1 * | 10/2016 | H04L 63/0823 |
| WO | WO-2016171682 A1 * | 10/2016 | G06F 11/00 |
| WO | 2019156716 | 8/2019 | |

* cited by examiner

Request Token 202
Outer: self-generated SRK_PUB
Inner: deviceID (serial#, TPM_ID, EK_PUB)

Challenge Token 204
Outer-outer: CDS private key signature
Outer: SRK_PUB encryption
Middle: EK_PUB encryption
Inner: token signed with CDS private key
    (includes deviceID, manager URL, Manager ID,
    TTL, SRK_PUB, and nonce)

Bearer Token 206
Outer: SRK_PRIV signature
Inner: decrypted, signed token (from challenge) and
    nonce

TOKEN-BASED ZERO-TOUCH ENROLLMENT FOR PROVISIONING EDGE COMPUTING APPLICATIONS

CROSS-REFERENCE TO RELATED APPLICATIONS

This application is a continuation of U.S. patent application U.S. patent application Ser. No. 17/062,348, filed Oct. 2, 2020, entitled "TOKEN-BASED ZERO-TOUCH ENROLLMENT FOR PROVISIONING EDGE COMPUTING APPLICATIONS," the full disclosure of which is hereby incorporated herein by reference in its entirety for all purposes.

BACKGROUND

An increasing number and variety of devices are being configured to connect and exchange data with other devices or systems over a network, such as the Internet. These devices, many of which are often referred to as Internet of Things ("IoT") devices, often need to be able to locate or identify other devices or systems with which they should communicate. Because these devices can be sold to multiple entities or associated with a wide variety of external systems, however, these devices typically are not produced with that information already stored to those devices, such that the devices have to obtain, or be provided with, information about these other devices or systems. In order to avoid having to manually program or configure these devices, which may include many devices for specific entities, various "zero-touch" approaches have been utilized whereby these devices can automatically obtain this information without manual intervention. There are various issues with these prior approaches that can make them undesirable for certain systems or usage, however, such as the fact that prior approaches require direct communication between a central authority and a device manager, and expose the location of the device manager to other devices or entities, which generates unnecessary security risks. Further, prior approaches require a multi-trip communication challenge-response between each device and a corresponding central authority, which significantly increases traffic and complexity of these approaches.

BRIEF DESCRIPTION OF THE DRAWINGS

Various embodiments in accordance with the present disclosure will be described with reference to the drawings, in which:

FIG. 2 illustrates example tokens that can be utilized, according to at least one embodiment;

DETAILED DESCRIPTION

Approaches in accordance with various embodiments overcome these and other deficiencies by utilizing one or more token-based approaches with an advantageous signing and encryption structures. In at least one embodiment, a device undergoing an initial startup can send a request for information to a central authority, or other entity, system, or service from which that device can obtain information and for which an address or destination is stored in this device. The central authority can then, if the device is recognized, generate and send a challenge token that is specific to that device. The challenge token can include one or more security mechanisms (e.g., encryption with a specific key or a digital signature) that enable that challenge token to be decrypted and verified by that device. The device can then convert this challenge token from the central authority to an unforgeable bearer token, such as by digitally signing a decrypted version of the challenge token. The device can then present this bearer token to a device manager, or other entity, system, or service associated with that device that is able to provide configuration information for the device for its intended tasks(s). The device manager can utilize the bearer token to verify the device, then send the respective configuration data to the device. The device can then utilize this configuration information to, after startup has completed, perform its intended task(s). Such an approach can enable a manager to authenticate a device using information from a central authority, such as a central directory service (CDS), but without having any direct communication between the CDS and the various managers. In an embodiment where there can only be one trip between a device and the CDS, the CDS can provide a response that validates the device, provide identity information for a manager that only the validated device can access, and include a token that the device can provide to the manager to prove that the device was validly directed to that manager.

Figure 1:
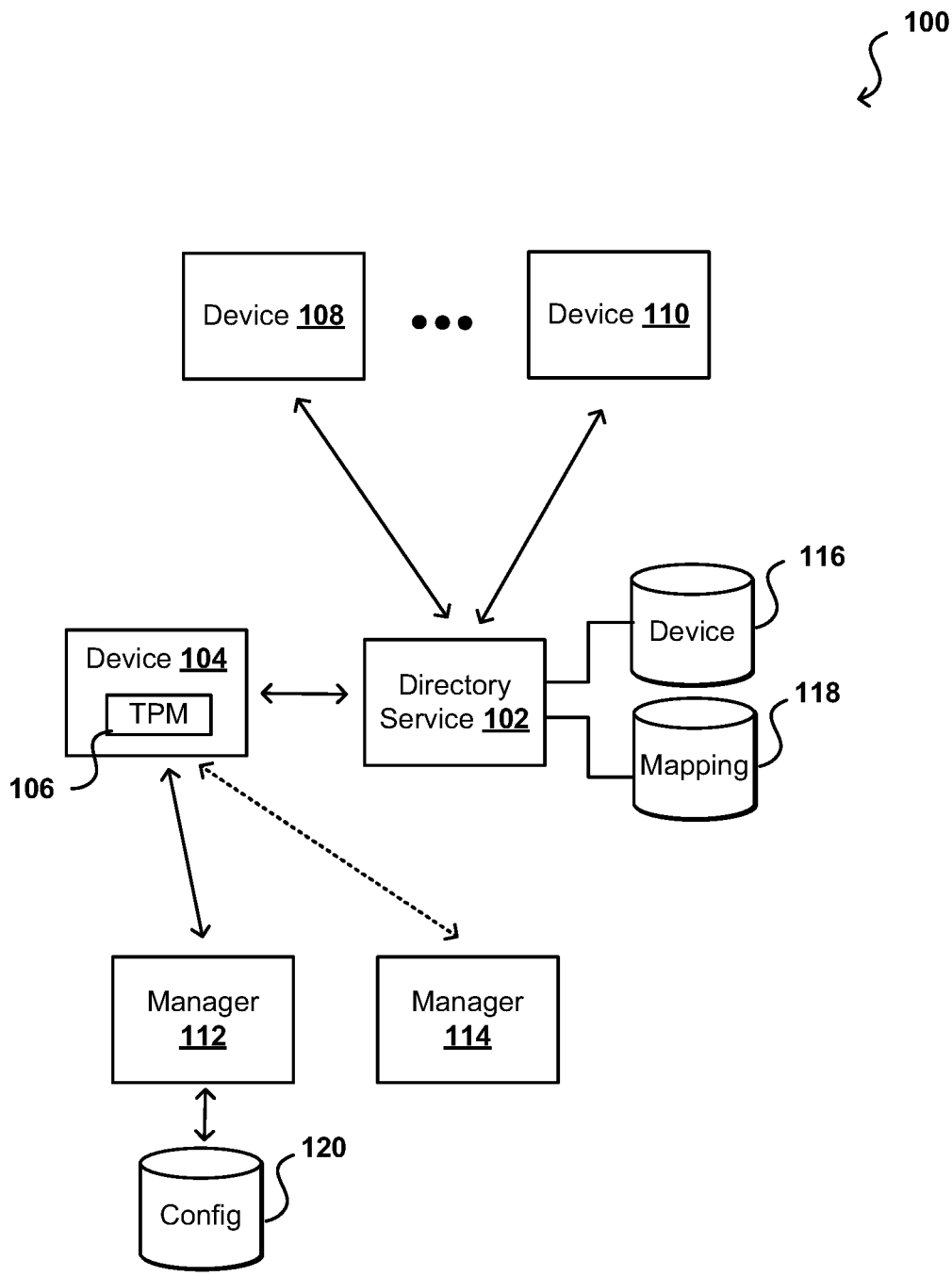
FIG. 1 illustrates architecture for identifying a device manager, according to at least one embodiment.

FIG. 1 illustrates example architecture 100 that can be used to provide such functionality in accordance with at least one embodiment. In this example, there can be various devices 104, 108, 110 that are able to communicate over at least one network. There can be any number of these devices, which can be of various device types. In general, these devices include at least circuitry and software that enables them to communicate over a connected network, such as the Internet, an Ethernet, a local area network (LAN), a cellular network, or a peer-to-peer network, through a wired and/or wireless connection. In some embodiments, a device may include embedded computer circuitry, as may include a microprocessor or microcontroller, as well as memory for storing at least executable instructions and configuration information. These devices may include devices such as computer peripherals, smart vehicles, or other IoT or network-connectable devices.

As mentioned, a manufacturer may produce many of these devices, which can be sold to various entities. Each of these entities may want the respective devices to communicate to specific other devices, systems, or services, such as may allow for management and configuration of these devices. It can be desirable for at least some of these entities to not have to manually program or configure these devices for this communication, such as to provide addresses for one or more device managers that can provide configuration data, updates, and other such information. As an example, a retailer may purchase many cameras for its stores and may prefer to not have to manually configure each of these cameras to communicate with its security system. In at least one embodiment, these devices can instead be configured to contact a central directory service ("CDS") 102 or other such trusted entity, system, or service at startup. The role of a CDS in such a configuration is to authenticate the device and then redirect the device to the appropriate manager server. This directory service 102 may comprise a server or other computing system or device that is able to receive requests or communications from any of these devices 106, 108, 110, verify information about those devices, then provide those devices with information about a device manager that is associated with a specific device, such as may be associated with an entity that purchased that device. There may be multiple such manager systems 112, 114, and a directory service 102 (of which there may also be more than one) can provide information to a given device 104 as to which manager 112 that device should contact for information. In at least one embodiment, a directory service 102 receiving a request from a device can check information in a device database 116, or other such location, to determine whether the information provided in the request corresponds to valid device information. If so, the directory service 102 can consult a mapping database 118, or other such storage location, to determine a manager 112 that corresponds (e.g., is mapped) to that device. The directory service 120 can then send this, and any other relevant, information to the device 104.

Once the appropriate manager information is received, a device 104 can contact the identified manager 112, which can determine the appropriate configuration information, as may be stored in a configuration repository 120, and provide that configuration to the device 104 in order for that device to complete the startup process and be ready to perform its respective task(s). These tasks can be any appropriate tasks known or used for network connected devices, as may include security monitoring, status monitoring, automation, navigation, data processing, and the like.

In at least one embodiment, token-based communication can be used as a security mechanism for any or all of these communications. This can include a single token, or multiple tokens, in various embodiments. These tokens can include, or be secured using, information that is specific to one or more of the device, the CDS, and the respective manager. For example, a device can have a serial number, as well as one or more identifiers for internal components such as a trusted platform module ("TPM") that can store sensitive information such as one or more private keys. A device and a CDS may have one or more symmetric or asymmetric keys that can be used to encrypt one or more of these tokens. In at least one embodiment, a combination of encryption and digital signatures can be used with these tokens to increase security of these communications.

FIG. 2 illustrates example tokens 200 that can be generated for use in such a process. Each of these tokens can include multiple layers of security, using information that should only be known to the relevant entities. Thus, an entity attempting to impersonate any of these devices or systems should be unable to decrypt one or more of these tokens in an enrollment or other such process. A first example token is a request token 202 that can be provided from a device, during a startup process, to a CDS or other such entity. In this example, the request token includes an identifier for that device ("deviceID"). This deviceID may be generated by the device based on specific information, as may include a tuple of a device serial number, a TPM identifier (TPM_ID), and a persistent endorsement key (EK) for that device. Other device identifiers may be used as well, as may correspond to just a serial number in some embodiments. This request token 202 can be wrapped in an outer security layer that can include encryption using a self-generated key (SRK), which is an untrusted key in this example. In at least one embodiment this can be a key that is generated by this device to represent the device, instead of using the persistent key EK. The EK and SRK may both correspond to an asymmetric key pair with public (PUB) and private (PRIV) keys. The self-generated key can be used because a given device might be sold or repurposed, and thus may be associated with different managers during the device lifetime. Using a self-generated key instead of a persistent key will prevent this device from being able to access information for a different owner or task that might otherwise be able to be accessed if only using the persistent key that does not change. When a device is wiped and repurposed, it can generate a new asymmetric key pair (e.g, SRK_PRIV and SRK_PUB) to be used for verification, such that the device is only able to access information for its current purpose, or that is associated with its current owner or manager.

A second example token is a challenge token 204 that can be generated by a CDS and sent to a requesting device. This challenge token can be secured in such a way that only a valid device, as the device presents itself as, should be able to decrypt. This example challenge token includes information useful for the device in determining the appropriate manager, and for the manager to verify the device is contacting the correct manager, such as a manager URL (or other contact address or mechanism) and a manager identifier. The challenge token can also include information specific to the device, such as the deviceID and the SRK_PUB, which can help the device and the corresponding manager verify that this information is relevant for this particular device. Additional information can be included as well, such as an expiration date or time to live (TTL) value, and a random nonce that is generated for each token, such that if a second challenge token is received with the same nonce then this can be an indication that someone or something is trying to reuse the same challenge token, which can be handled appropriately.

This challenge token can be signed, in an inner layer, using a CDS private key. This signed key can be encrypted in a middle layer using the public persistent key for the device, EK_PUB. This helps to ensure that this challenge token can only be decrypted by this device, with that EK PRIV key in its TPM, regardless of its current owner or manager. This token can then be encrypted in an outer layer using the self-generated public key (SRK_PUB), which should only be able to be decrypted by the device in its current state of ownership, using its private self-generated key (SRK_PRIV). Encrypting with both EK_PUB and SRK-_PUB helps to ensure that the proper device is obtaining access (as SRK is a device-generated key and may be difficult to authenticate), as well as that the device is only obtaining information for its current state of operation (as EK persists across any owners or states). This challenge token can then be signed in an outer-outer layer using the private key signature of the CDS. It should be understood that these layers could be in different orders, and that similar, fewer, additional, or alternative layers can be used within the scope of various embodiments.

A third example token is a bearer token 206 that can be provided from a device—having successfully decrypted a challenge token 204 and determined the appropriate manager information—to that manager to obtain configuration information. This bearer token 206 can include the signed but decrypted challenge token, which includes information about the manager and the device, as well as a nonce and a TTL value in this example. The information about the device and the manager enables the manager to determine that this is a request from a specific device that is intended for this particular manager, while the TTL value can enable the manager to determine that the bearer token is still valid and the nonce can enable the manager to determine that the bearer token is not being attempted to be reused. This bearer token can then be signed with the self-generated private key (SRK_PRIV) of the device, so the manager can verify that this was sent from the proper device by decrypting using the corresponding public key. It can be important in at least some embodiments for the device to sign using the self-generated key instead of the persistent key, as a manager should only be able to decrypt data for that device in its current state or with its current ownership, and not for other states or ownership that may be associated with other managers.

Figure 3:
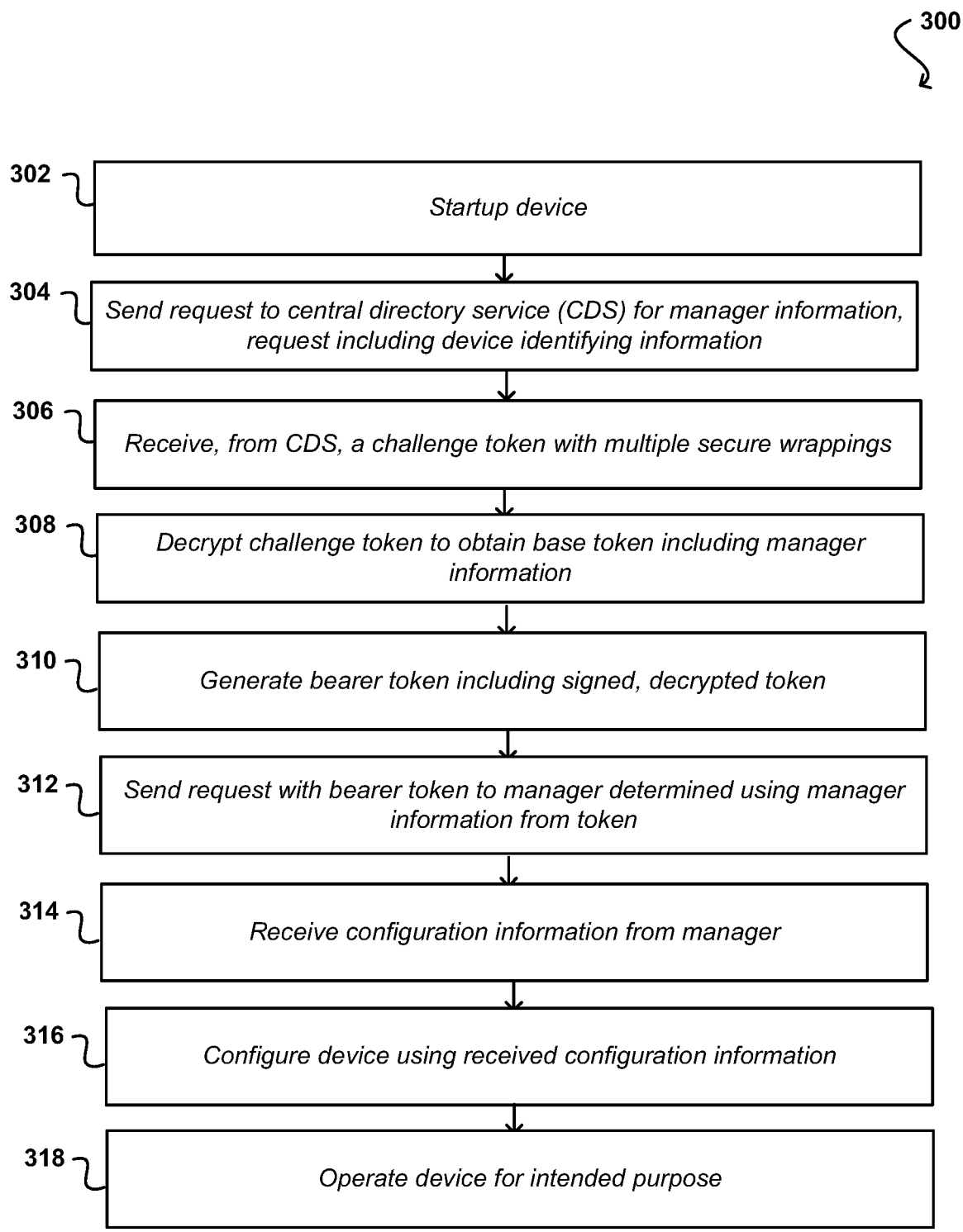
FIG. 3 illustrates a process for identifying a manager to provide configuration information for a device, according to at least one embodiment.

FIG. 3 illustrates an example process 300 for zero-touch enrollment of a device that can be performed in accordance with at least one embodiment. It should be understood that for this and other processes presented herein that there can be additional, fewer, or alternative steps performed in similar or alternative order, or at least partially in parallel, within scope of various embodiments unless otherwise specifically stated. In this example, a device undergoes an initial startup 302, either as a new device or after a wiping of the device where new configuration and manager information is to be obtained. This device can generate and send 304 a request to a central directory service (CDS) or other such entity for manager information, where that request can include device-identifying information in a request token such as discussed with respect to FIG. 2. A CDS receiving this request can verify the device information, and can determine the appropriate manager for that device. A challenge token can then be received 306 from the CDS to the device, where that challenge token includes information about the manager with multiple secure wrappings. The device can decrypt 308 that challenge token, and perform any appropriate verification, in order to obtain a base token (or decrypted challenge token) that includes the manager information, as well as potentially other information as discussed herein. The device can then generate 610 a bearer token including the decrypted token and digitally signed by the device, effectively converting the challenge token to a bearer token. A request for configuration information, including the bearer token, can then be sent 312 to the manager determined using the manager information discovered from the decrypted token. The manager can verify the information and send the appropriate configuration (and other relevant) information to the device. The device can receive 314 this configuration information from the manager, and can use this received configuration information to configure 316 the device. The device can, after startup and configuration have completed, operate 318 for its intended purpose.

Figure 4:
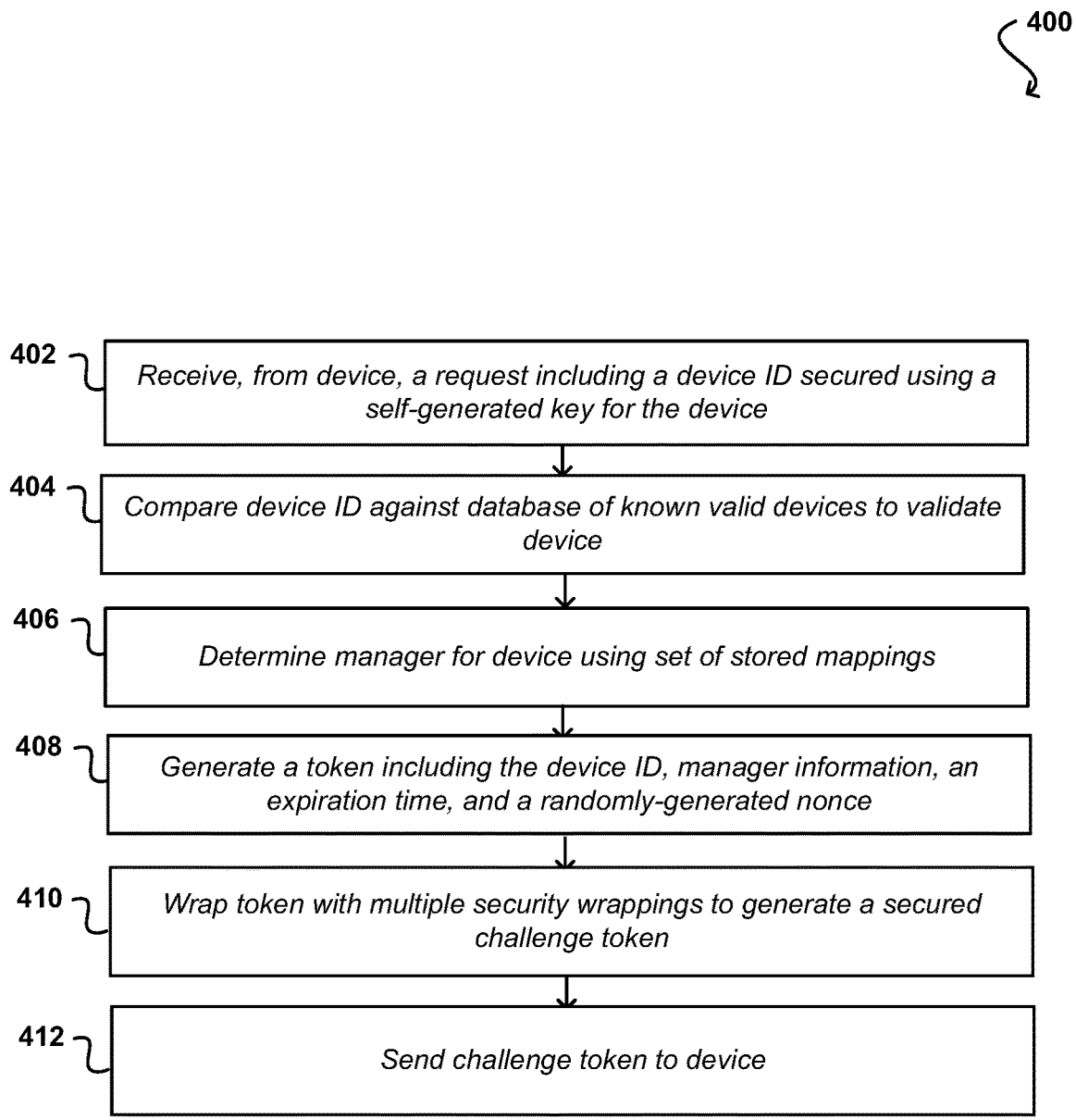
FIG. 4 illustrates a process for generating a challenge token for a device, according to at least one embodiment.

FIG. 4 illustrates an example process 400 that can be performed by an entity or system such as a central directory service (CDS), such as may be part of an enrollment process described with respect to FIG. 3. In this example, a CDS can receive 402 from a device a request including a device identifier (ID) encrypted or signed using a self-generated key for the device. The CDS can compare 404 that device identifier, and any information contained therein, against a database of known valid devices in order to validate the device. In at least one embodiment, this can include not only finding the serial number for that device in a database, but ensuring that key information provided corresponds to that serial number in the device database. If the device cannot be validated, then the CDS can either ignore the request or send back some type of error message, among other such options. If the device information is able to be verified, a manager 406 or other relevant system or service can be determined 406 for that device, such as by consulting a set of mappings for known devices. The CDS can generate 408 a token including information useful for determining the manager appropriate for this device, as may include a device identifier, manager information, an expiration time for the token, and a randomly-generated nonce. This token can be wrapped 410 with one or more security wrappings to generate a secured challenge token, where that token can be encrypted and/or signed one or multiple times. The challenge token can then be sent 412 to the device, wherein the device having the appropriate security information should be able to decrypt and utilize the information in the challenge token.

Figure 5:
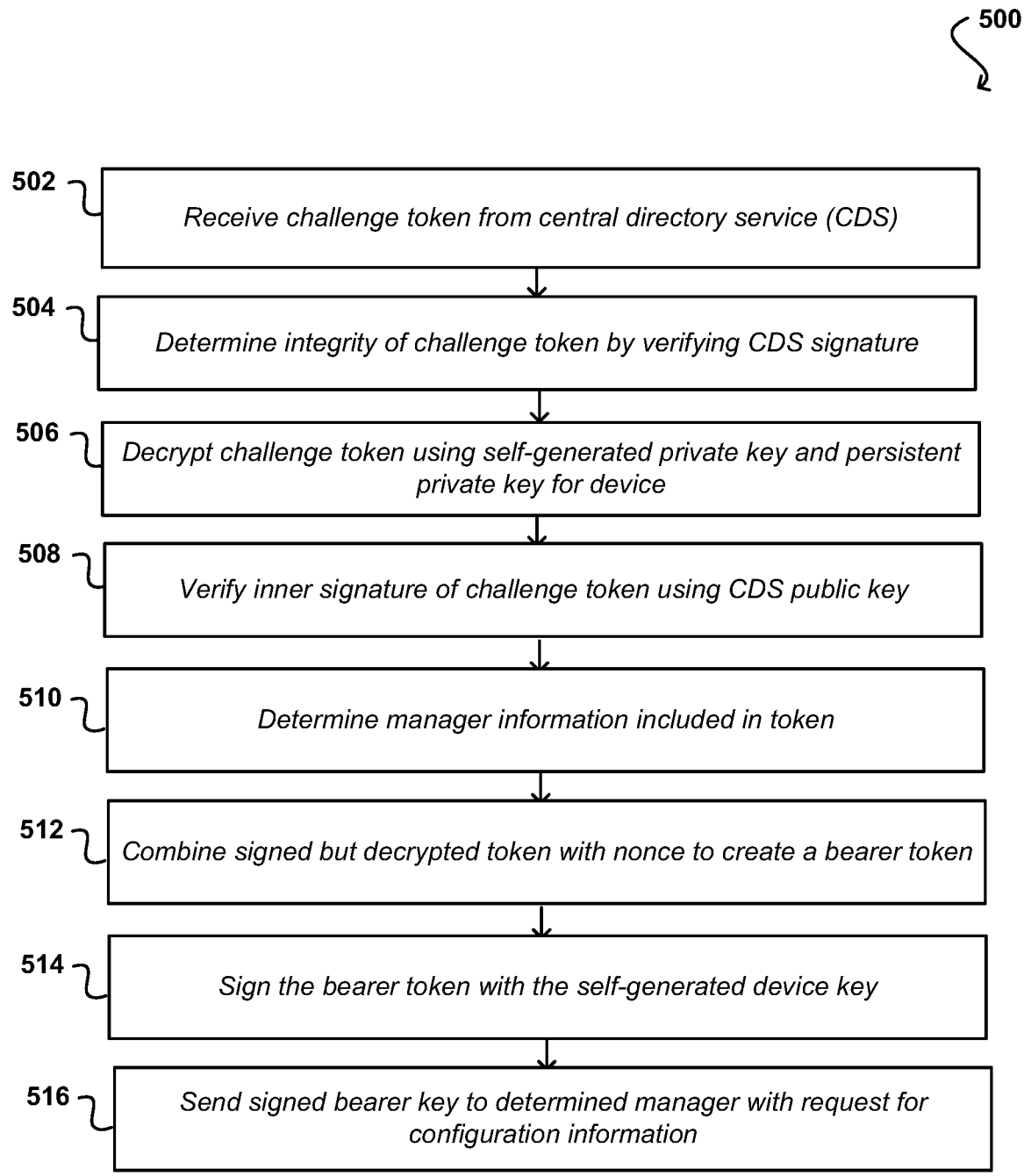
FIG. 5 illustrates a process for converting a challenge token to a bearer token, according to at least one embodiment.

FIG. 5 illustrates an example process 500 that can be performed by a device receiving a challenge token for cryptographic validation, such as that generated in the process of FIG. 4 and as may be part of an enrollment process described with respect to FIG. 3. As with other processes discussed herein, order or inclusion of at least some of these steps may vary between embodiments. In this example, a device receives 502 a challenge token from a central directory service (CDS) or other such entity in response to a prior request for information. The device can determine 504 the integrity of the challenge token by first verifying a CDS signature on the challenge token. The device can then decrypt 506 the challenge token using a self-generated key, as well as a persistent key for the device. As mentioned, using both keys can ensure that a device only accesses information permissible for its current state of ownership or usage, and ensures that the device is the device that it claims to be. The device, having successfully decrypted the challenge token, can then verify 508 the inner signature of the challenge token using the CDS public key. Once decrypted and verified, the device can determine 510 the manager information included in the token. This can include, for example, an identifier and address information, such as a uniform resource locator (URL). The device can then combine 512 the signed but decrypted challenge token with the nonce from inside the token to create a bearer token, which can then be signed 514 with the self-generated device key. The self-generated key is used instead of the persistent device key as the manager should only be able to access information for the device while that manager is associated with that device, and not at any other time. The device can then send 516 the bearer token to the determined manager with a request for configuration information, or other such communication. In this process, the manager does not communicate directly with the CDS, as the device communicates with the CDS in one back and forth communication, then the device communicates directly with the manager. In such a process, the identity of the manager is not revealed to a device unless that device can authenticate itself via the challenge token.

Figure 6:
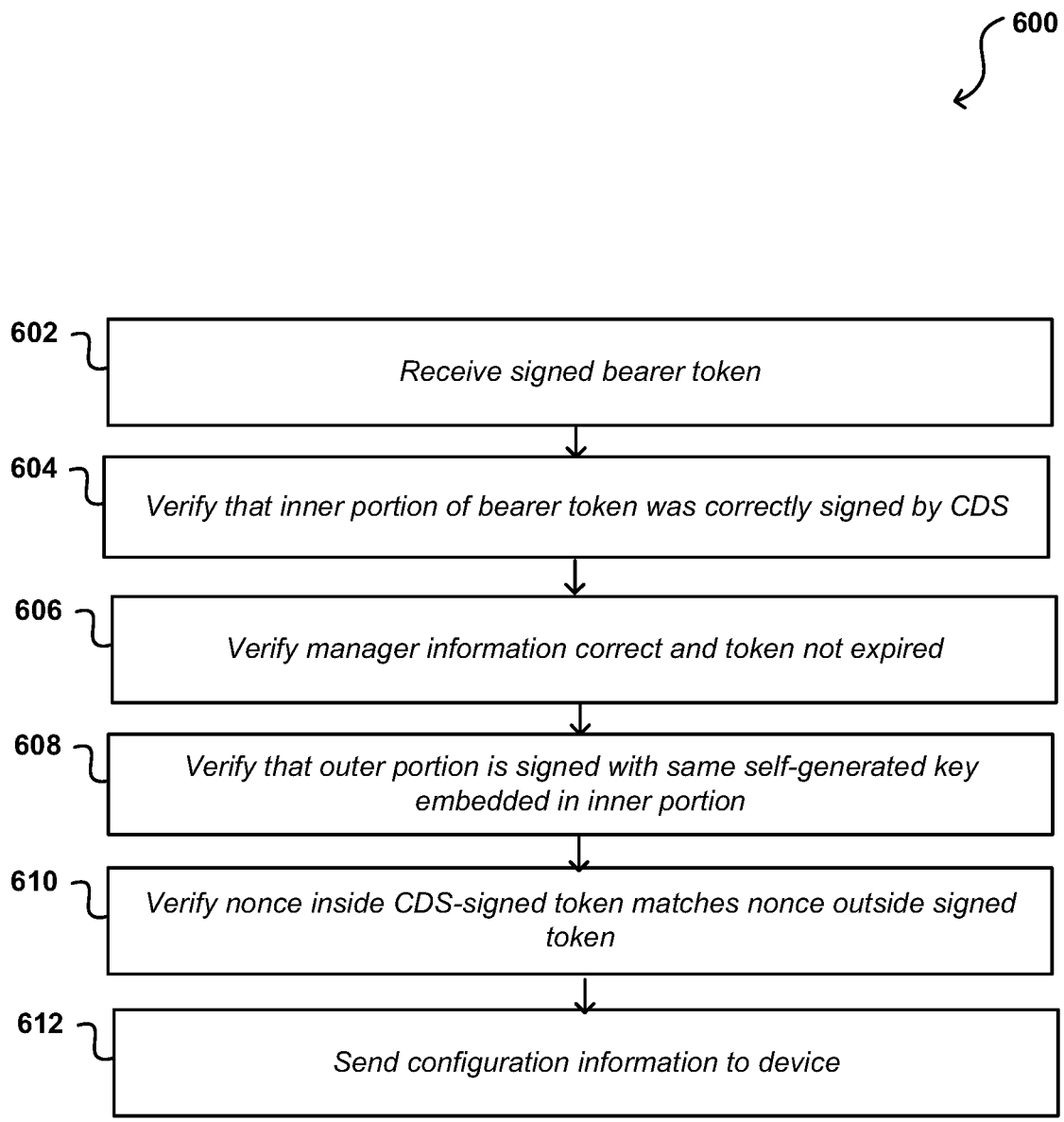
FIG. 6 illustrates a process for verifying a device using a bearer token and providing device configuration information, according to at least one embodiment.

FIG. 6 illustrates an example process 600 that can be performed by a device manager receiving a bearer token with a request for configuration information, such as that generated in the process of FIG. 5 and as may be part of an enrollment process described with respect to FIG. 3. In this example, a signed bearer token is received 602 with a request. The manager can verify 604 that an inner portion of the bearer token was correctly signed by the CDS. In at least one embodiment, security requirements may indicate that a manager must be able to verify that a device has been referred to that manager by the CDS, but without the manager having to contact the CDS. The manager can also verify 606 that the manager information contained therein is correct and the token has not expired. The manager can also verify 608 that an outer portion or wrapper is signed with the same self-generated device key that is embedded in the inner portion. The manager can also verify 610 that a nonce inside this CDS-signed bearer token matches a nonce outside this CDS-signed token but included in the bearer token. As mentioned previously, at least some of these steps can be performed in different orders or at least partially in parallel. Once this information is verified, the correct configuration information can be determined and sent 612 to the device, whereby the device is able to utilize the configuration to complete its startup procedure in order to be able to perform its intended task(s). In at least some embodiments, this manager can provide, or be associated with, a console or interface that enables a user or entity associated with this device, and potentially other devices, to manage these devices. In at least one embodiment, an entity can log into their console and see a list of the devices that have automatically enrolled and/or been provisioned through such a process. The device can also make calls using one or more application programming interfaces (APIs) exposed by the manager system, and may utilize the self-generated key with these API calls.

Data Center

Figure 7:
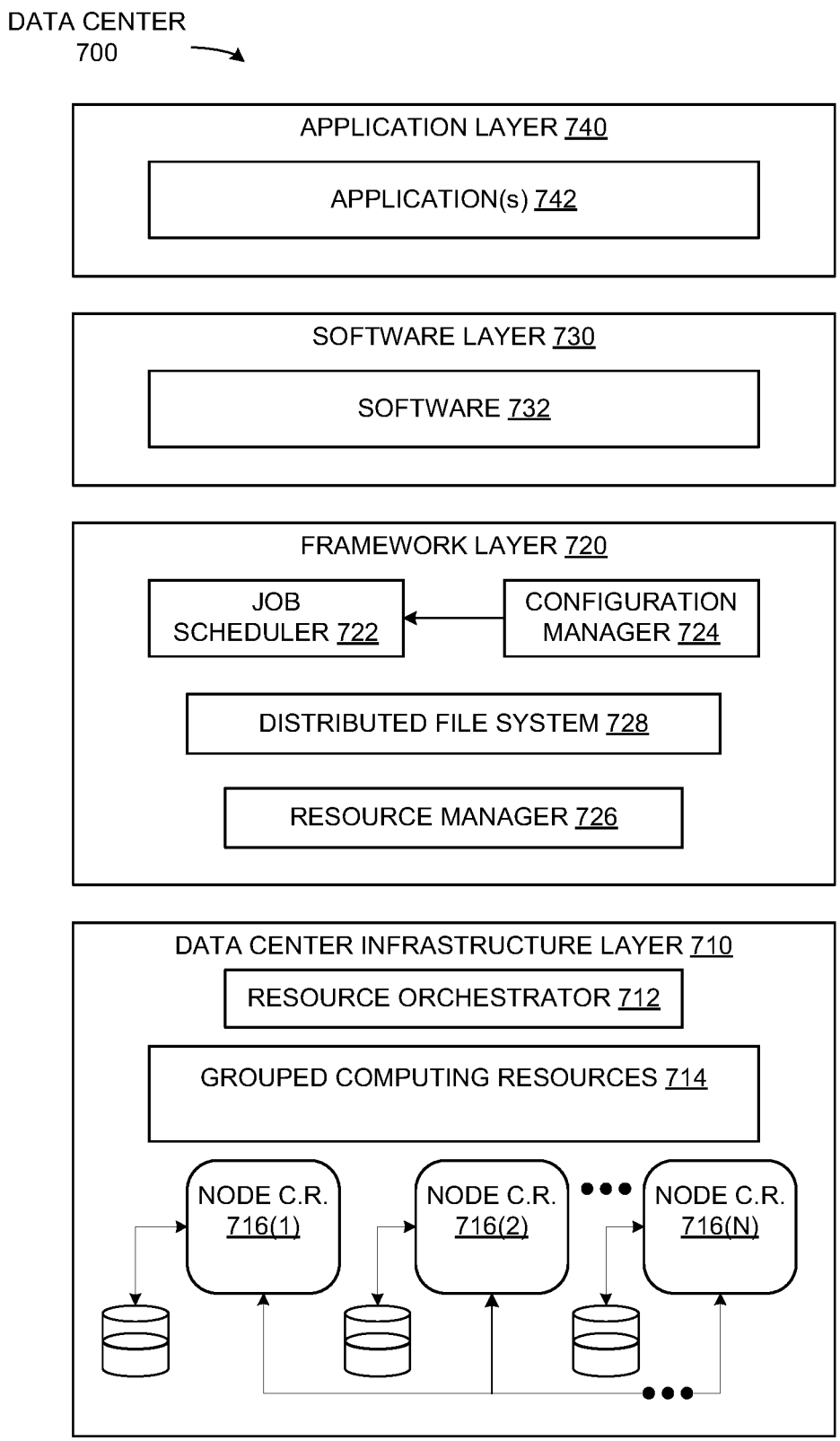
FIG. 7 illustrates an example data center system, according to at least one embodiment.

FIG. 7 illustrates an example data center 700, in which at least one embodiment may be used. For example, a CDS or device manager may be included in a data center in at least one embodiment. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used for zero-touch enrollment of devices with associated manager systems via a secure token-based approach.

Computer Systems

Figure 8:
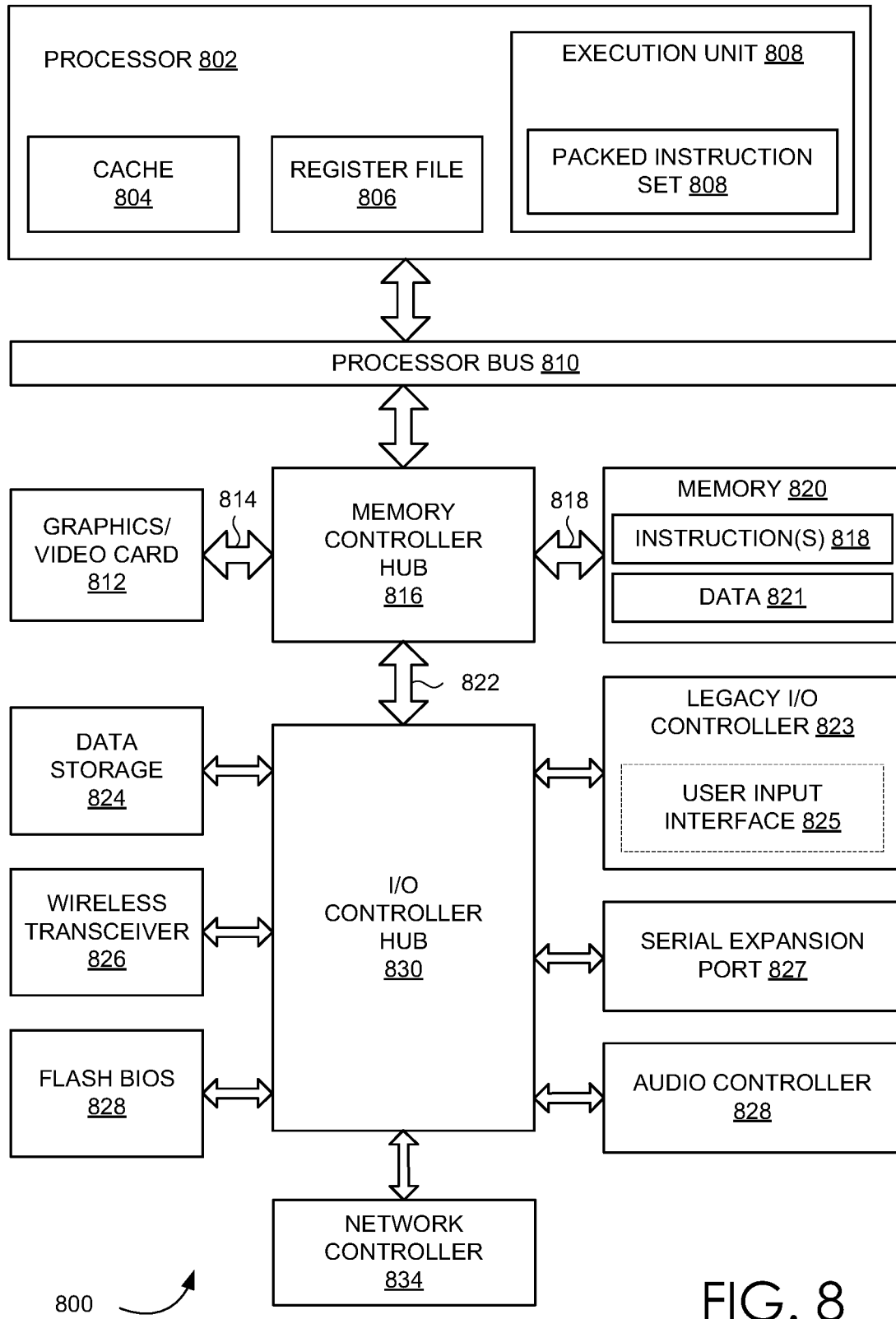
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used for zero-touch enrollment of devices with associated manager systems via a secure token-based approach.

Figure 9:
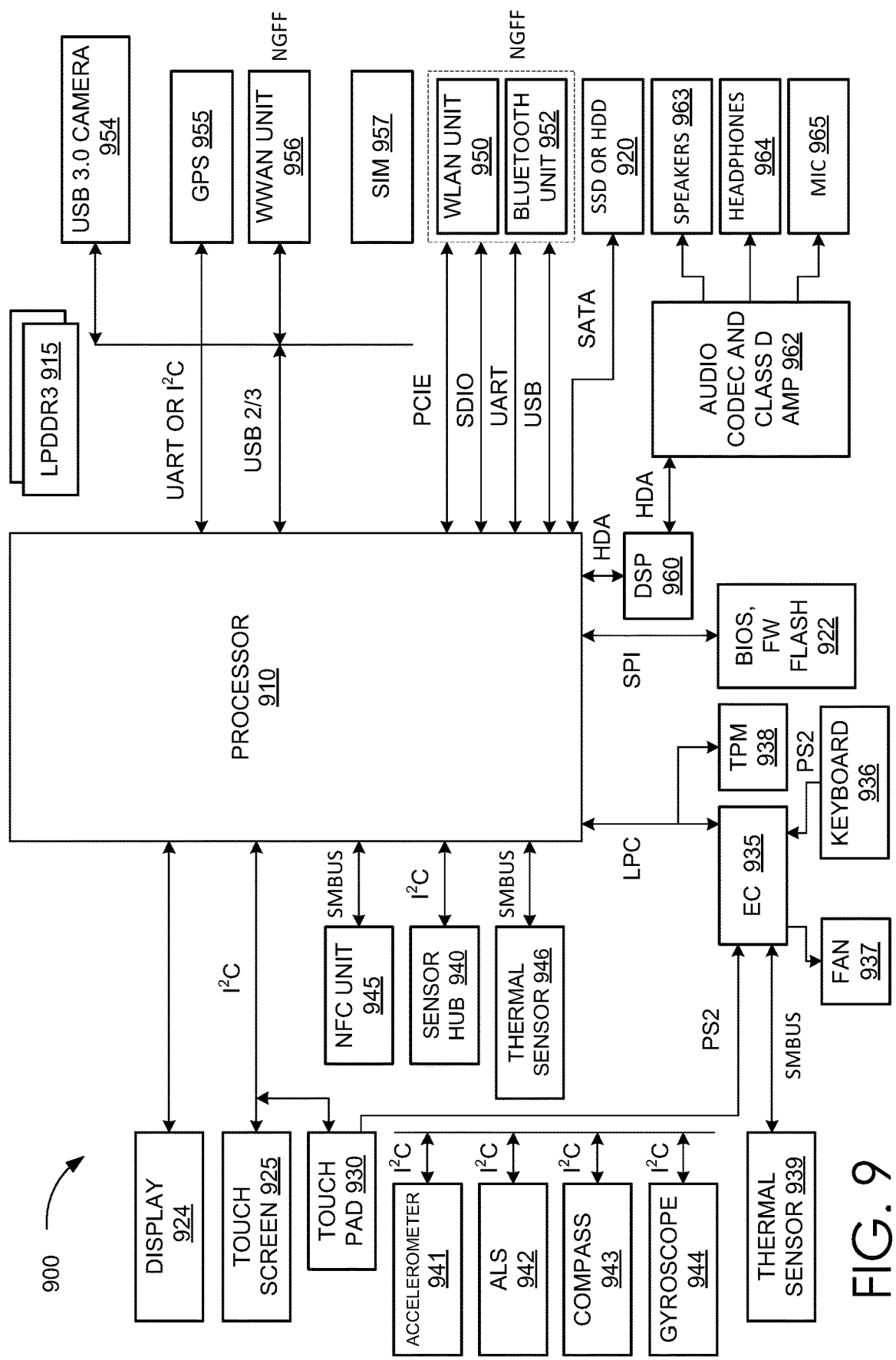
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used for zero-touch enrollment of devices with associated manager systems via a secure token-based approach.

Figure 10:
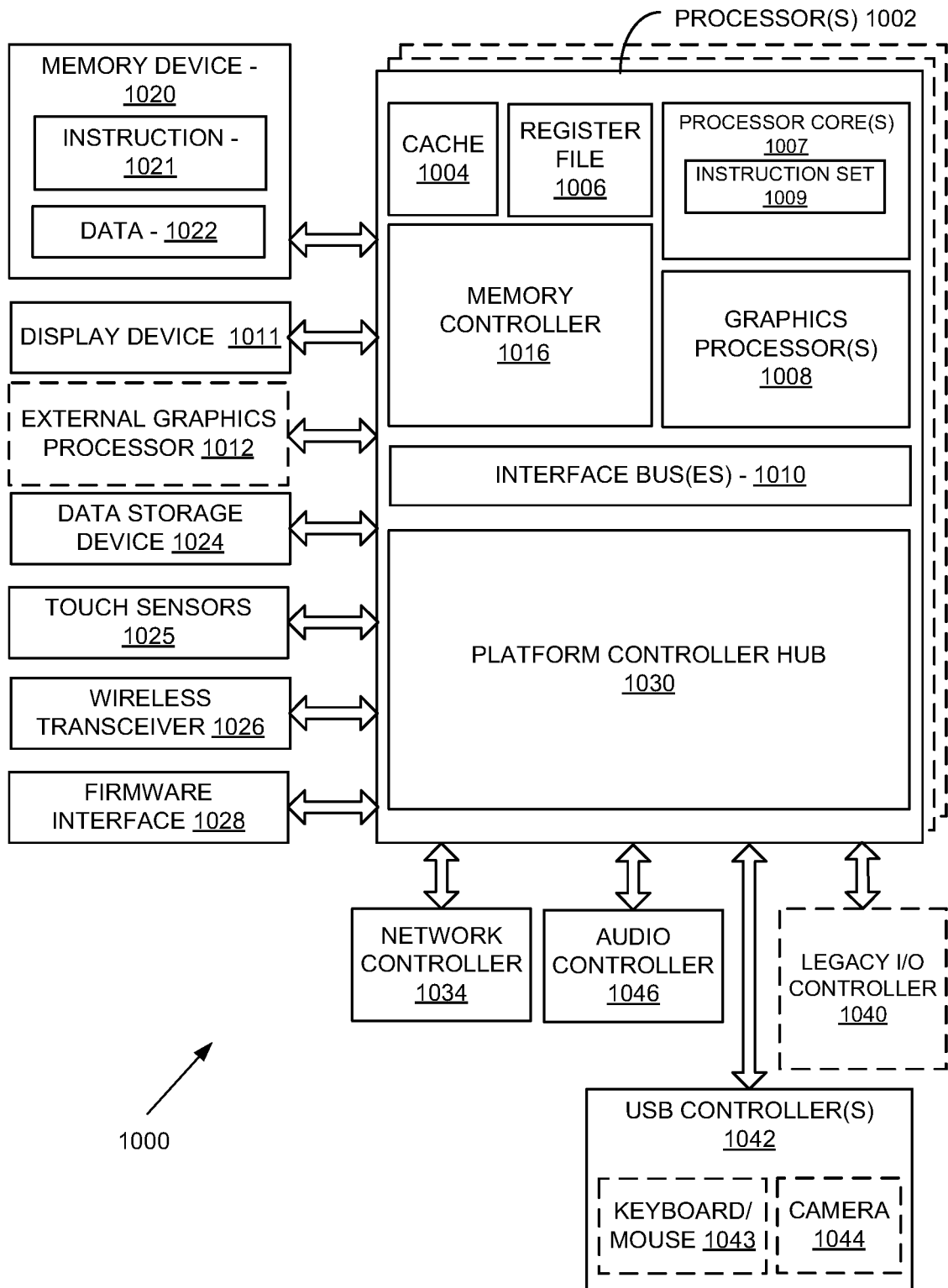
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used for zero-touch enrollment of devices with associated manager systems via a secure token-based approach.

Figure 11:
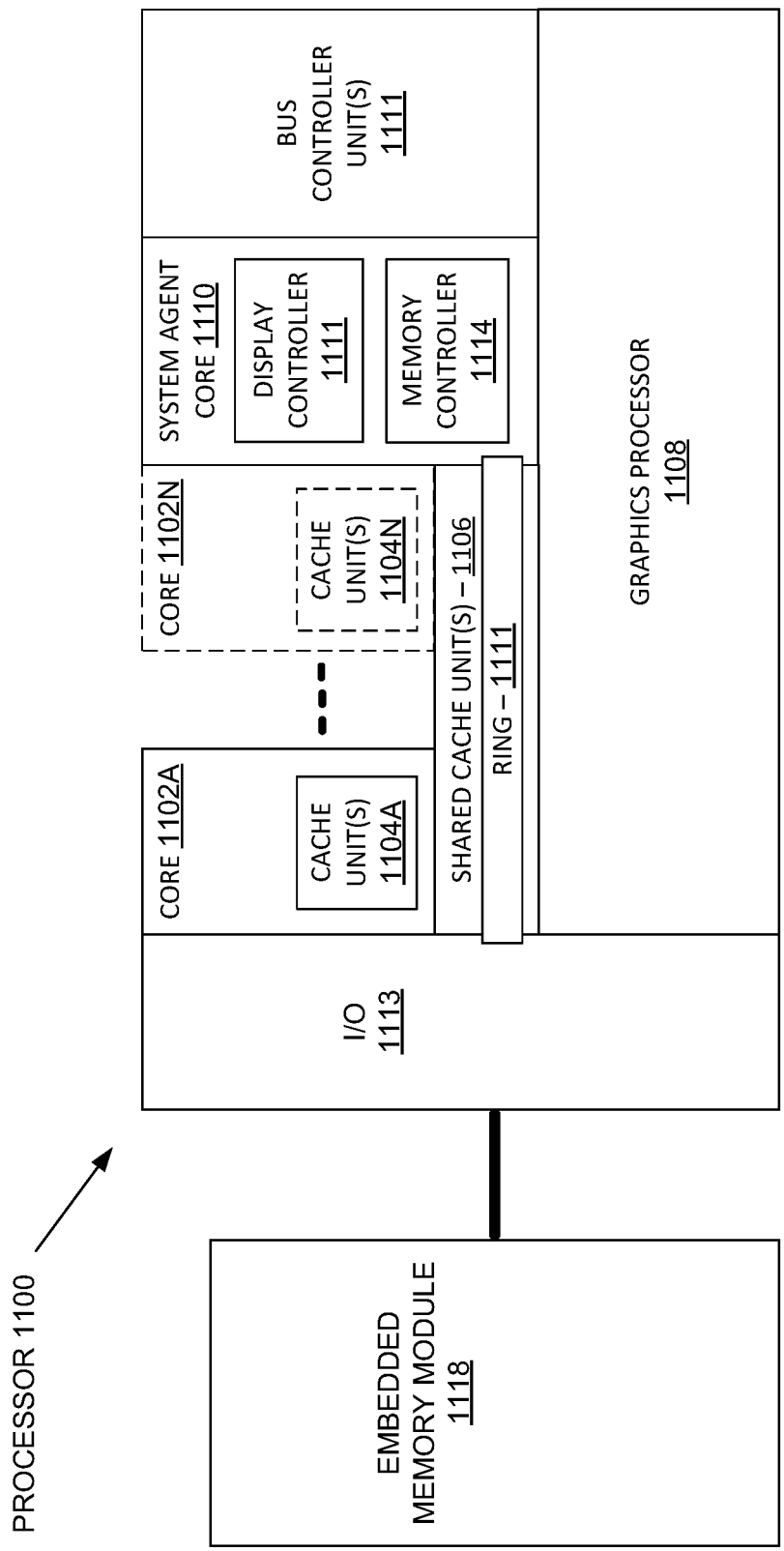
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used for zero-touch enrollment of devices with associated manager systems via a secure token-based approach.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising:
receiving a challenge token issued by a trusted authority storing token information for one or more manager systems associated with one or more devices;
generating, based at least in part on the challenge token, a bearer token secured with a secure key for a device of the one or more devices; and
sending a request, including the bearer token, to a destination specified by the challenge token, wherein a recipient of the request is able to authenticate the device based at least on a device identifier in the challenge token that is mapped to a manager system of the one or more manager systems corresponding to the destination,
the bearer token enabling the manager system to determine and provide configuration information to the device for the device to operate for an intended purpose.

2. The method of claim 1, wherein the token information specifies address and identification information for one or more recipients including the one or more manager systems associated with the one or more devices.

3. The method of claim 1, further comprising:
decrypting, by the device, the challenge token to access the destination specified by the challenge token; and
converting the decrypted challenge token to the bearer token.

4. The method of claim 1, wherein the challenge token includes one or more of a device identifier for the device, manager system address information, a manager system identifier, a token expiration time, the secure key for the device, and a randomly-generated nonce.

5. The method of claim 1, wherein the challenge token includes one or more layers of encryption, the one or more layers of encryption including at least one of a digital signature of a trusted authority generating the challenge token, encryption using a self-generated secure key for the device, or encryption using a persistent secure key for the device.

6. The method of claim 1, wherein the bearer token includes a decrypted challenge token with a nonce appended that was included in the decrypted challenge token, the bearer token signed with a self-generated secure key for the device.

7. The method of claim 1, wherein the manager system is enabled to verify authentication of the device by the trusted authority that generated the challenge token without directly communicating with the trusted authority.

8. The method of claim 7, further comprising:
providing the configuration information to the device, wherein the device is able to be authenticated by the manager system and receive the configuration information using only a single request to, and receiving only a single response from, the manager system.

9. The method of claim 1, further comprising:
providing the configuration information to the device; and
receiving the challenge token when the configuration information is not stored on the device during an initial startup of the device.

10. A device, comprising:
a processor; and
memory including instructions that, when performed by the processor, cause the device to:
receive a challenge token having one or more layers of encryption, wherein the challenge token is received from a trusted authority storing token information for one or more manager systems associated with one or more devices;
generate a bearer token secured with a secure key for a device based at least on the challenge token; and
send a request including the bearer token to a manager system to enable the manager system to verify authentication of the device of the one or more devices by the trusted authority without directly communicating with the trusted authority, the bearer token enabling the manager system to determine and provide configuration information to the device for the device to operate for an intended purpose.

11. The device of claim 10, wherein the token information specifies address and identification information for the one or more manager systems associated with the one or more devices.

12. The device of claim 11, wherein the one or more layers of encryption of the challenge token include at least one of a digital signature of the trusted authority generating the challenge token, encryption using a self-generated secure key for the device, or encryption using a persistent secure key for the device.

13. The device of claim 10, wherein the instructions that, when performed by the processor, further cause the device to:
provide the configuration information to the device, wherein the device is able to be authenticated by the manager system and receive the configuration information using only a single request to, and receiving only a single response from, the manager system.

14. A processor, comprising one or more processing units configured to:
receive a challenge token having one or more layers of encryption, wherein the challenge token is received from a trusted authority storing information for one or more manager systems associated with one or more devices;
generate a bearer token secured with a secure key for a device based at least on the challenge token; and
send a request including the bearer token to a manager system to enable the manager system to verify authentication of the device by the trusted authority without directly communicating with the trusted authority,
the bearer token enabling the manager system to determine and provide configuration information to the device for the device to operate for an intended purpose.

15. The processor of claim 14, wherein at least one of the one or more processing units is further configured to:
provide configuration information to the device; and
verify, from the bearer token, additional identifying information for the manager system before sending the configuration information to the device.

16. The processor of claim 14, wherein a digital signature on the bearer token corresponds to a self-generated secure key for the device different from a persistent key for the device that was used to encrypt the challenge token.

17. The processor of claim 14, wherein the bearer token enables the manager system to verify authentication of the device by the trusted authority that generated the challenge token without directly communicating with the trusted authority.

* * * * *